R. E. HAMILTON.
COUPLING AND STEERING MEANS FOR TRACTORS.
APPLICATION FILED FEB. 5, 1916.

1,230,293.

Patented June 19, 1917.
3 SHEETS—SHEET 1.

WITNESS

INVENTOR.
Rush E. Hamilton
BY
ATTORNEYS.

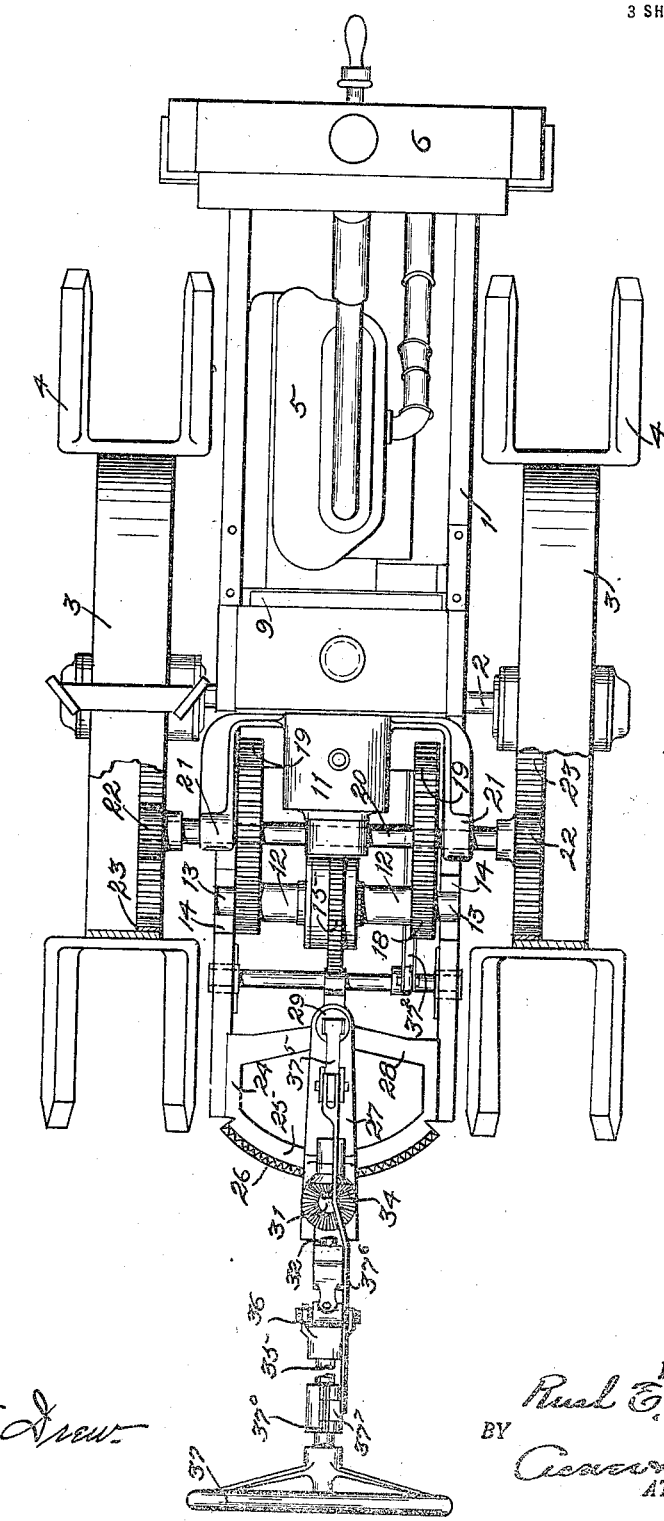

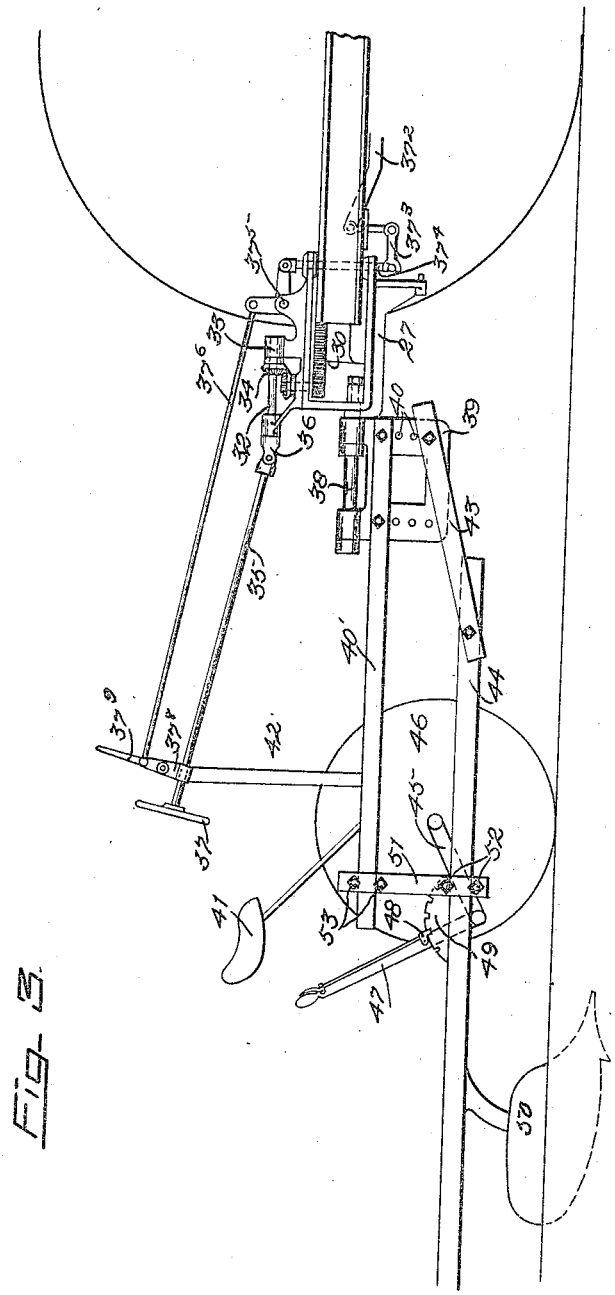

UNITED STATES PATENT OFFICE.

RUSH E. HAMILTON, OF GEYSERVILLE, CALIFORNIA, ASSIGNOR TO HAMILTON TRACTOR COMPANY, OF SAN FRANCISCO, CALIFORNIA, A CORPORATION OF CALIFORNIA.

COUPLING AND STEERING MEANS FOR TRACTORS.

1,230,293.

Specification of Letters Patent. Patented June 19, 1917.

Application filed February 5, 1916. Serial No. 76,340.

*To all whom it may concern:*

Be it known that I, RUSH E. HAMILTON, a citizen of the United States, residing at Geyserville, in the county of Sonoma and State of California, have invented certain new and useful Improvements in Coupling and Steering Means for Tractors, of which the following is a specification.

The present invention relates to a draft coupling for connecting a trailer to a two wheeled tractor, whereby the tractor may be readily steered and the direction of travel thereof controlled.

The invention is more particularly designed for connecting wheeled plows, cultivators or other farming implements with a tractor, and whereby the implement will be enabled to be guided about the field and to operate close to trees, fences, and the like, and the invention has for its principal objects to provide a structure for rigidly connecting the implement with the tractor and which will permit the same to swing relatively to each other on a vertical axis, and which will permit the wheeled implement to oscillate relatively to the tractor on a longitudinal axis.

With the above mentioned and other objects in view, the invention consists in the novel construction and combination of parts hereinafter described, illustrated in the accompanying drawings and set forth in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 2 is a view in top plan of Fig. 1.

Fig. 3 is a side elevation in detail of the implement, disclosing the connection between the plow and the tractor and the steering mechanism.

Figure 1:
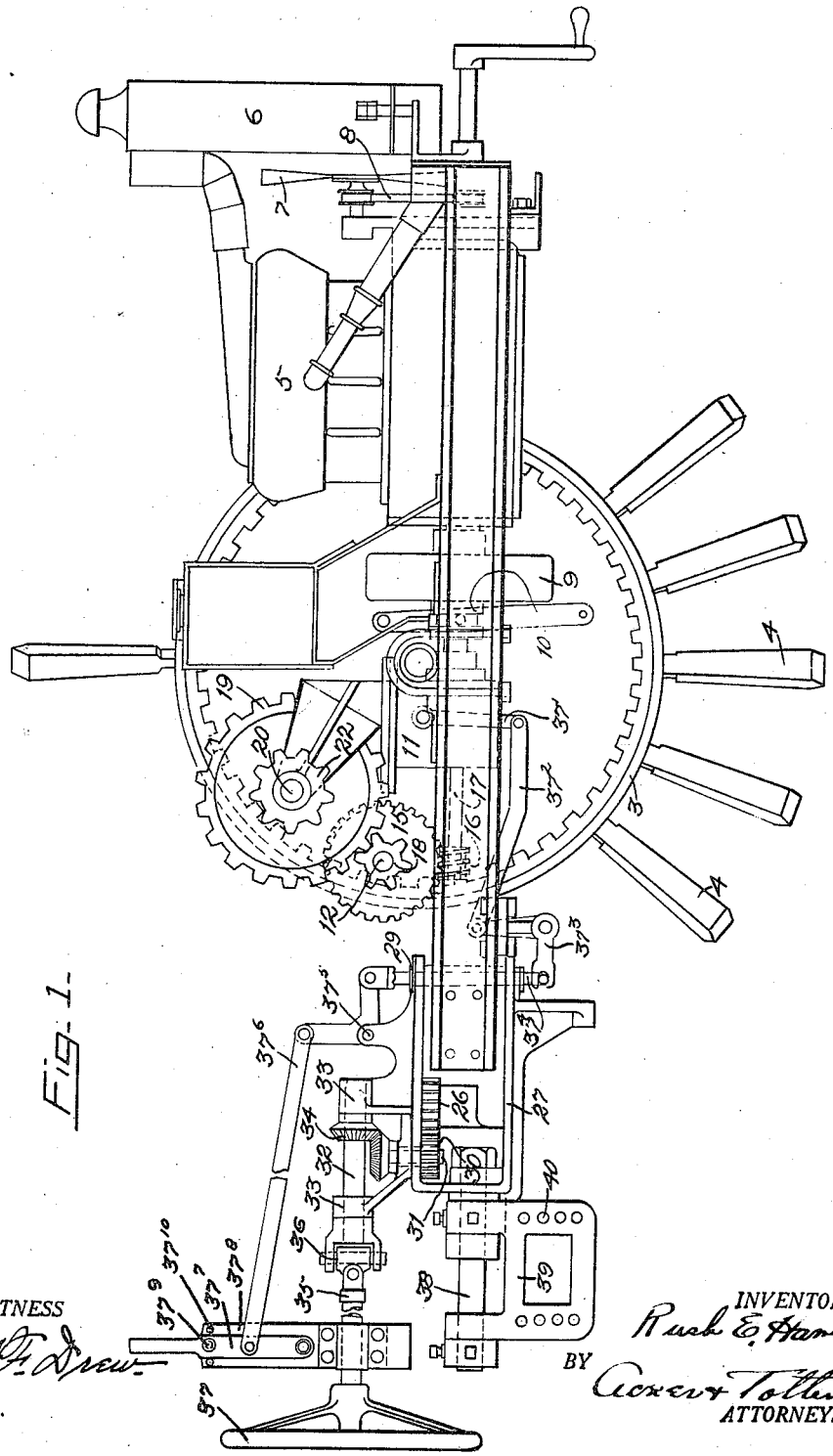
Figure 1 is a view in side elevation of an improved two wheeled tractor, disclosing the steering connection at the rear end thereof.

Referring more particularly to the drawings wherein like characters of reference designate corresponding parts throughout the several views,—1 is a suitable tractor frame carrying the axle 2 extending transversely centrally of the frame 1, supporting the wheels 3 which mount the traction members 4. Power is supplied to the wheels by a suitable motor 5 carried by the frame 1 and preferably of the internal combustion type, and which is cooled by a circulation of water from the radiator 6 and the fan 7 driven by a belt 8 from the engine crank shaft. The crank shaft carries a fly wheel 9 and drives through a suitable clutch 10 and the change speed gears mounted in a suitable gear box 11.

A split shaft 12, mounted in bearings 13 in the sub-frame 14 and driven through the differential 15, receives its power through a worm 16 carried by a shaft 17 driven by the gears in the box 11 and shaft 12 transmits the power through pinions 18 to gears 19 carried by a shaft 20 mounted in bearings 21 in the sub-frame 14. The shaft 20 carries at its opposite ends pinions 22 which operate on the internal gears 23, one of which is carried by each supporting wheel 3.

A suitable frame 24 is carried at the rear of the frame 1 and the same is formed with a segmental rear portion 25 provided with teeth 26. A steering yoke 27 extends over the rear of the frame 24, and is vertically pivoted at its inner end to the frame member 28 by the tubular bolt 29, so that the free rear end thereof is free to swing horizontally. A pinion 30 carried by a shaft 31 journaled in the steering yoke 27 engages the teeth 26 of the segment 25 and on the rotation thereof causes the yoke and frame to move relatively to each other to steer the tractor, as desired. A shaft 32 is rotatably carried in bearings 33 on the yoke 27 and is in geared relation with the shaft 31 through the beveled gears 34. The shaft 32 is rotated by a steering rod 35 connected thereto by a universal joint 36 and carrying at its end a steering wheel 37 which is positioned adjacent to the operator's station on the plow, hereinafter described.

A means controlling the power connection from the engine to the wheels of the tractor extends to the operator's station on the plow, thereby requiring but a single operator to control the implement, steer the tractor and control the speed of the same. A gear shift member 37' is provided for shifting the change speed gears, and the same is connected by a link $37^2$ with one arm of a pivotally mounted crank arm 37³, the opposite arm of said crank arm 37³ is connected by a link 37⁴, which extends through the tubular bolt 29, with one arm of a pivoted crank arm 37⁵, the opposite arm of which connects with a link 37⁶ pivotally mounted to a spring lever 37⁷. The lever is pivotally carried by a bracket 37⁸ extending around the steering rod 35 and carries a pin 37⁹ which is adapted when the lever is adjusted to different positions on the bracket to be received in apertures 37¹⁰.

A stub shaft 38 extends substantially horizontally from the approximate center of the rear of the yoke 27 and is rigidly secured thereto, and pivotally supported thereby to swing on a longitudinal axis relative to the frame 1 is a clevis 39 in the form of a substantially flat plate formed in its surface with the perforations 40. Rigidly bolted at one end to the clevis 39 is a tractor bar 40' which extends rearwardly therefrom, and said bar carries a seat 41 for the operator, and a brace or frame 42 which supports the plate 37⁸.

Plow beam links 43 are pivotally connected at one end to the clevis 39 and pivotally connect at their opposite end with the forward end of a plow beam 44 which pivotally carries the substantially U-shaped supporting axle 45 mounting the supporting wheels 46. A lever 47 for raising and lowering the position of the free ends of the axle relative to the plow beam is secured thereto, and the same carries a pawl 48 which coöperates with a slotted segment 49 for changing the angle of the plow beam.

The plow beam carries one or more plows 50; for purposes of illustration I have disclosed a single mole board plow, and said beam is connected slightly in advance of the axle 45 with the tractor bar 40' by the members 51 which are positioned one on either side of the plow beam and rigidly secured thereto by the bolts 52. The upper end of the members 51 are connected by the bolts 53, positioned one on either side of the tractor bar, and said bolts are positioned to permit of a free pivotal and sliding movement of the members relative to the plow beam.

My improved coupling enables the operator to steer or guide the tractor in the desired path as the turning of the steering wheel causes the tractor to move laterally, and this is permitted by the differential 15 in the shaft 12 which enables the tractor wheels to travel at different speeds. The coupling enables the tractor and implement following to swing relatively to each other on a vertical axis and also enables the two members to oscillate relatively to each other on a horizontal axis and at the same time prevents any independent raising or lowering of the ends of the tractor or implement.

By my improved construction I have provided an apparatus which is capable of complete control by a single operator stationed adjacent to the implement.

Having thus described my invention, what I claim as new and desire to protect by Letters Patent is:

1. In combination with a two wheeled tractor, of a wheeled member to be drawn thereby, a connection between the tractor and wheeled member comprising a yoke carried by the tractor and pivoted to swing on a vertical axis, a clevis carried by the yoke and pivoted to swing on a horizontal axis, and a rigid connection between the wheeled member to be drawn and the clevis.

2. A connection for uniting a tractor and a wheeled member or implement to be drawn thereby, the same comprising a yoke carried by one of the members and pivoted thereto, to swing on a vertical axis, a clevis carried by the yoke and pivoted to swing on a horizontal axis, and a rigid connection between the other member and the clevis.

3. In combination with a two wheeled tractor, of a wheeled member to be drawn thereby, a segmental rack carried at the rear of the tractor, a yoke carried by the tractor and extending over said segmental rack and pivoted to swing on a vertical axis, a connection between said wheeled member and yoke, a rotatable gear carried by said yoke and engaging said segmental rack, and a steering member associated with said gear and extending adjacent to an operator's station on said wheeled member.

4. In combination with a two wheeled tractor, a wheeled member to be drawn thereby and capable of carrying an operator, a pivoted connection between said tractor and wheeled member, said connection maintaining said tractor and wheeled member horizontally disposed relatively to each other and at the same time, permitting of a swinging movement relatively to each other on a vertical and horizontal axis, and steering means for steering said tractor and wheeled member.

5. In combination with a two wheeled tractor, of a wheeled member to be drawn thereby, a draft connection between the tractor and wheeled member comprising a yoke carried by the tractor and pivoted to swing on a vertical axis, a stub shaft extending horizontally from said yoke, a clevis pivotally supported by said shaft to swing on a horizontal axis, and a rigid connection between the wheeled member to be drawn and said clevis.

6. In combination with a tractor, a wheeled member to be drawn thereby and capable of carrying an operator, a pivoted connection between the wheeled member and tractor, a tractor bar rigidly secured to the connection and movable therewith, a steering connection between the pivoted connection and the tractor, operating means for said steering connection carried by said tractor bar and extending in proximity to the operator's station on said wheeled member, and tractor controlling means extending from the tractor through the pivot of the connection between the wheeled member and tractor to a point adjacent to said operator's station.

7. In combination with a two wheeled tractor, a wheeled member to be drawn thereby and capable of carrying an operator, a pivoted connection between said tractor and wheeled member, said connection permitting said tractor and wheeled member to swing relative to each other on a vertical axis and to oscillate relatively to each other on a horizontal axis and maintaining said tractor and wheeled member horizontally disposed relatively to each other, steering means, carried by the coupling member and tractor for moving the same relatively to each other on the vertical connection between the same, and steering connection for operating said steering means and extending in proximity to the operator's station on the wheeled member.

8. In combination with a two wheeled tractor, a wheeled member to be drawn thereby and capable of carrying an operator, a pivoted connection between said tractor and wheeled member and permitting said tractor and wheeled member to swing relatively to each other on a vertical axis, a steering connection between the pivoted connection and the tractor, operating means for said steering connection, tractor controlling means, said tractor controlling means and said steering operating means extending to a point in proximity to the operator's station on said wheeled member.

9. In combination with a tractor, a wheeled member to be drawn thereby and capable of carrying an operator, a pivoted connection between the wheeled member and tractor, said connection permitting said tractor and wheeled member to swing relatively to each other on a vertical axis, a steering mechanism between the pivoted connection and the tractor, tractor controlling means, said tractor controlling means and said steering mechanism adapted to swing with said wheeled tractor on the movement of said pivoted connection.

In testimony whereof I have signed my name to this specification in the presence of two subscribing witnesses.

RUSH E. HAMILTON.

Witnesses:
HARRY A. TOTTEN,
D. B. RICHARDS.